(12) United States Patent
Cho

(10) Patent No.: US 11,189,157 B2
(45) Date of Patent: Nov. 30, 2021

(54) ELECTRONIC APPARATUS AND METHOD OF CONTROLLING THE SAME

(71) Applicant: Samsung Electronics Co., Ltd., Suwon-si (KR)

(72) Inventor: Yonghee Cho, Suwon-si (KR)

(73) Assignee: SAMSUNG ELECTRONICS CO., LTD., Suwon-si (KR)

(*) Notice: Subject to any disclaimer, the term of this patent is extended or adjusted under 35 U.S.C. 154(b) by 0 days.

(21) Appl. No.: 17/022,327

(22) Filed: Sep. 16, 2020

(65) Prior Publication Data

US 2021/0090422 A1    Mar. 25, 2021

(30) Foreign Application Priority Data

Sep. 19, 2019    (KR) .......................... 10-2019-0115663

(51) Int. Cl.
G08B 21/24    (2006.01)

(52) U.S. Cl.
CPC .................................. *G08B 21/24* (2013.01)

(58) Field of Classification Search
None
See application file for complete search history.

(56) References Cited

U.S. PATENT DOCUMENTS

2006/0109112 A1* 5/2006 Haines .................. G08B 21/24
340/539.32

FOREIGN PATENT DOCUMENTS

JP    2009-27602 A    2/2009

* cited by examiner

*Primary Examiner* — Thomas S McCormack
(74) *Attorney, Agent, or Firm* — Staas & Halsey, LLP

(57) ABSTRACT

Disclosed is an electronic apparatus, which helps to easily find a location of a wireless device (remote controller). The electronic apparatus includes: a signal input/output configured to communicate with a wireless device; an output; and a processor configured to: collect a movement history of the wireless device within a communication area through the signal input/output, and output information about a location, in which the wireless device is expected to be present within the communication area based on the movement history of the wireless device, to the output as an event for finding the wireless device occurs.

13 Claims, 9 Drawing Sheets

ELECTRONIC APPARATUS AND METHOD OF CONTROLLING THE SAME

CROSS-REFERENCE TO RELATED THE APPLICATION

This application is based on and claims priority under 35 U.S.C. § 119 to Korean Patent Application No. 10-2019-0115663 filed on Sep. 19, 2019 in the Korean Intellectual Property Office, the disclosure of which is incorporated by reference herein in its entirety.

BACKGROUND

Field

The disclosure relates to an electronic apparatus, which helps to easily find a location of a wireless device connected through a wireless interface, and a method of controlling the same.

Description of the Related Art

Conventionally, there have been many cases where a user doesn't remember where the remote controller is located when a predetermined period of time elapses after using the remote controller to control operations of a television (TV), a set-top box (STB), a game console, a home appliance, etc., or the user can't find the remote controller as its location is changed according to unexpected situations.

To solve this, there has been proposed a method of making the remote controller output a sound, generate vibration or emit light when a user presses a certain operation button for several seconds. However, such a method of using the sound, the vibration and the light is useless when the remote controller is located under bedclothes or hidden in a gap between sofa cushions, and therefore has a limit to finding the remote controller.

As other methods of finding the remote controller, there is a method of tracking the location of the remote controller connected by wireless communication and informing a user of the location. This method is useful for tracking the location only when both the remote controller and the wireless device are powered on. If the remote controller is powered off or the wireless communication is disabled, it is impossible to track the location.

SUMMARY

An aspect of the disclosure is to solve the foregoing problems and provide an electronic apparatus, which helps to easily find a location of a wireless device even though the wireless device is powered off as its battery is all used up or it is out of order, and a method of controlling the same.

Another aspect of the disclosure is to provide an electronic apparatus, which registers multi-wireless devices and displays and manages locations of the registered multi-wireless devices on one screen, and a method of controlling the same.

According to an embodiment of the disclosure, there is provided an electronic apparatus including: a signal input/output configured to communicate with a wireless device; an output; and a processor configured to: collect a movement history of the wireless device within a communication area through the signal input/output, and output information about a location, in which the wireless device is expected to be present within the communication area based on the movement history of the wireless device, to the output as an event for finding the wireless device occurs.

The processor may be configured to output information about a location where the wireless device is expected to be present based on a location where the wireless device last moved.

The processor may be configured to further output information about a second location where the wireless device is expected to be absent to the output based on a location to which the wireless device has never moved within the communication area based on the movement history.

The information about the location may include information about at least one of a route or time in which the wireless device moved.

The processor may be configured to output the information about a plurality of locations to the output in order of how more likely the wireless device is present.

The processor may be configured to rank the plurality of locations based on how more frequent the wireless device stayed.

The signal input/output may be configured to receive information about the movement history of the wireless device from an external device provided within the communication area.

The communication area may be partitioned into a plurality of previously defined sub areas.

The plurality of sub areas may include three-dimensional space areas.

The electronic apparatus may further include a memory, and the memory may be configured to include a location tracking module for the wireless device.

The output may include a display, and the processor may be configured to display a user interface showing the information about the location on the display.

The output may include a loudspeaker, and the processor may be configured to output the information about the location to the loudspeaker.

The processor may be configured to collect the movement history of the wireless device as the wireless device is identified as a previously defined device.

According to other embodiment of the disclosure, there is provided a method of controlling an electronic apparatus, including: registering at least one wireless device; collecting a movement history of the wireless device within a communication area; and outputting information about a location, in which the wireless device is expected to be present within the communication area based on the movement history of the wireless device, as an event for finding the wireless device occurs.

BRIEF DESCRIPTION OF THE DRAWINGS

The above and/or the aspects will become apparent and more readily appreciated from the following description of exemplary embodiments, taken in conjunction with the accompanying drawings, in which.

DETAILED DESCRIPTION OF EXEMPLARY EMBODIMENTS

Figure 1:
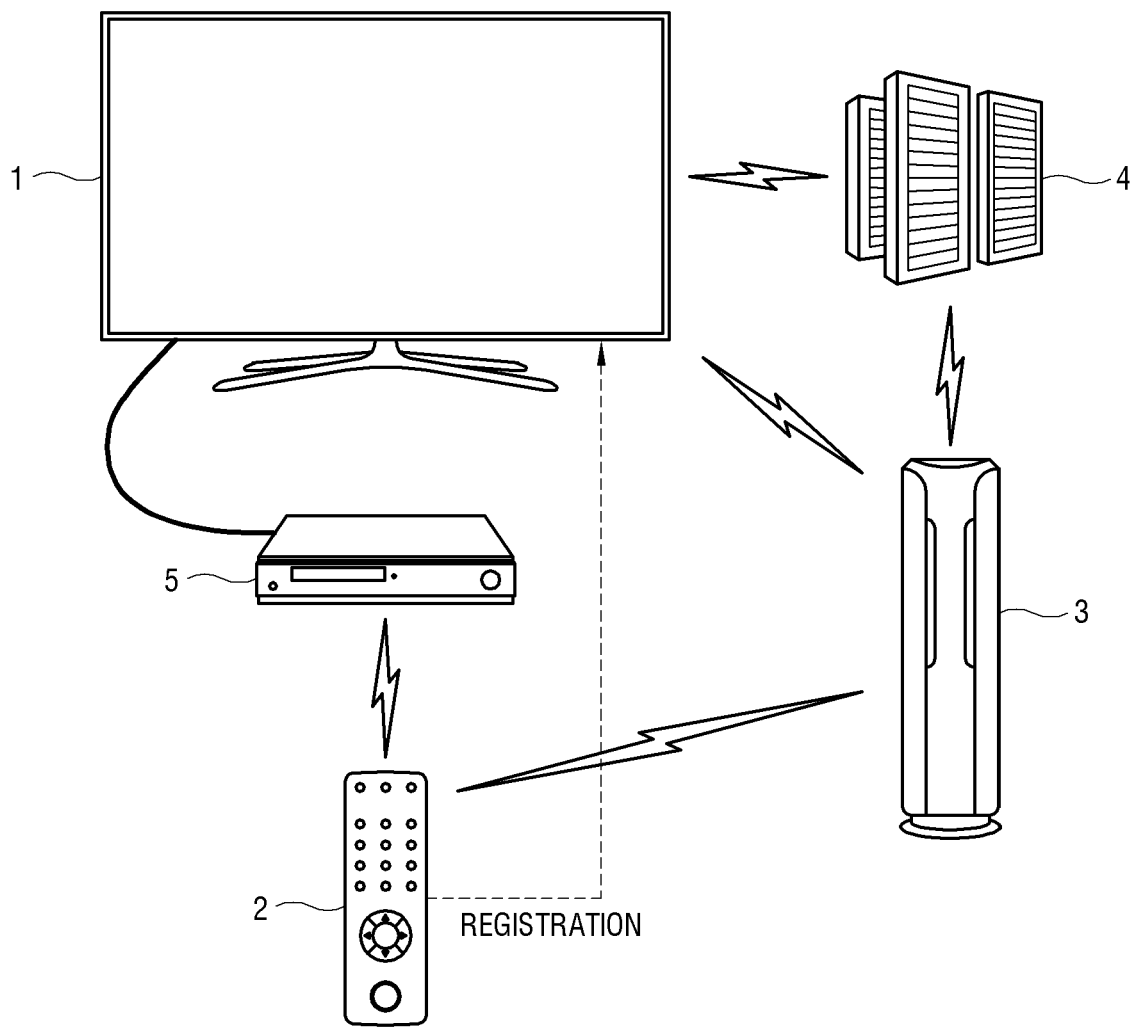
FIG. 1 illustrates an electronic apparatus according to an embodiment of the disclosure.

Below, embodiments of the disclosure will be described in detail with reference to the accompanying drawings. In the drawings, like numerals or symbols refer to like elements having substantially the same function, and the size of each element may be exaggerated for clarity and convenience of description. However, the technical concept of the disclosure and its key configurations and functions are not limited to those described in the following embodiments. In the following descriptions, details about publicly known technologies or configurations may be omitted if they unnecessarily obscure the gist of the disclosure.

In the disclosure, terms "have," "may have," "include," "may include," etc. indicate the presence of corresponding features (e.g. a numeral value, a function, an operation, or an element such as a part, etc.), and do not exclude the presence of additional features.

In the disclosure, terms "A or B", "at least one of A or/and B", "one or more of A or/and B" or the like may include all possible combinations of elements enumerated together. For example, "A or B", "at least one of A and B", or "at least one of A or B" may refer to all of the cases of (1) including at least one A, (2) including at least one B, or (3) including all of at least one A and at least one B.

In the disclosure, terms "first", "second", etc. are used only to distinguish one element from another, and singular forms are intended to include plural forms unless otherwise mentioned contextually.

In addition, in the disclosure, terms "upper", "lower", "left", "right", "inside", "outside", "inner", "outer", "front", "rear", etc. are defined with respect to the accompanying drawings, and do not restrict the shape or position of the elements.

Further, in the disclosure, the expression of "configured to (or set to)" may for example be replaced with "suitable for," "having the capacity to," "designed to," "adapted to," "made to," or "capable of" according to circumstances. Also, the expression of "configured to (or set to)" may not necessarily refer to only "specifically designed to" in terms of hardware. Instead, the "device configured to" may refer to "capable of" along with other devices or parts in a certain circumstance. For example, the phrase of "the sub processor configured to perform A, B, and C" may refer to a dedicated processor (e.g. an embedded processor) for performing the corresponding operations, or a generic-purpose processor (e.g. a central processing unit (CPU) or an application processor) for performing the corresponding operations by executing one or more software programs stored in a memory device.

In the disclosure, an electronic apparatus 10 according to various embodiments may include an electronic apparatus outputting various kinds of content, for example, at least one of a television (TV), an artificial intelligence (AI) speaker, a smartphone, a tablet personal computer (PC), a mobile phone, an image phone, an electronic (E)-book reader, a desktop PC, a laptop PC, a netbook computer, a workstation, a server, a personal digital assistant (PDA), an MP3 player, or an wearable device. In some embodiments, the electronic apparatus 1 may for example include at least one of a digital versatile disk (DVD) player, an audio system, a refrigerator, an air conditioner, an oven, a microwave oven, a washing machine, an air cleaner, a set-top box, a home-automation control panel, a security control panel, a media box, a game console, an electronic dictionary, a camcorder, or an electronic frame.

In an alternative embodiment, the electronic apparatus 1 may include at least one of various medical apparatuses (e.g. various portable medical measurement apparatuses (glucose monitors, heart-rate monitors, blood-pressure gauge monitors, thermometers, etc.), magnetic resonance angiography (MRA), magnetic resonance imaging (MRI), computed tomography (CT), scanning machines, ultrasonography machines, etc.), a navigation system, a global navigation satellite system (GNSS), an event data recorder (EDR), a flight data recorder (FDR), a vehicle infotainment system, marine electronic equipment (e.g. a marine navigation system, a gyrocompass, etc.), avionics, security devices, vehicle head units, industrial or household robots, a drone, an automated teller machine (ATM) of a financial institution, a point-of-sales (POS) device of a store, or Internet of Things (IOT) (e.g. a lamp, various sensors, a sprinkler, a fire alarm, a temperature controller, a street light, a toaster, an exerciser, a hot-water tank, a heater, a boiler, etc.).

A wireless device 2 may include a device capable of communicating with an electronic apparatus 1 through Wi-Fi, Bluetooth (BT), Internet of things (IOT), infrared data association (IrDA), a global positioning system (GPS), or the like wireless interface, for example, at least one of a remote controller, an electronic key, a smartphone, a tablet personal computer (PC), an IoT healthcare device, a mobile phone, a video phone, an electronic-book reader, a personal digital assistant (PDA), a portable multimedia player (PMP), an MP3 player, or a wearable device.

In the disclosure, a term "user" may refer to a human who uses the electronic apparatus 1 or an apparatus (e.g. an artificial intelligence (AI) electronic apparatus) that uses the electronic apparatus 1.

FIG. 1 illustrates the electronic apparatus 1, which supports a function of finding the location of the wireless device 2, according to a first embodiment of the disclosure.

The electronic apparatus 1 may for example be achieved by a TV that displays an image or an AI loudspeaker that outputs a sound. The electronic apparatus 1 may support a function of finding the location of the wireless device 2 after registering various wireless devices 2. The electronic apparatus 1 may directly communicate with the wireless device 2 or communicate with an IoT apparatus 3 or a server 4 present within a communication area to track the location of the wireless device 2 and output location information about whether the wireless device 2 is present or absent, so that a user can easily find the wireless device 2.

The wireless device 2 may be embodied by various remote controllers for controlling operations of the electronic apparatus 1 or other electronic apparatuses, or may be embodied by a small device such as an electronic key, a smartphone or the like which is registered to the electronic apparatus 1, communicates with the electronic apparatus 1 through a wireless interface, and is small to be hard to find.

The IoT apparatus 3 performs wireless communication with the wireless device 2 and transmits information about the location of the wireless device 2 to the electronic apparatus 1 or the server 4. The IoT apparatus 3 may be embodied by an electronic apparatus such as a refrigerator, an air conditioner, a washing machine, an audio system, a lighting apparatus, an oven, etc.

The server 4 may include each or combination of a content server that provides content, an IoT server that manages the IoT apparatus 3, and a voice recognition server that recognizes a voice. The server 4 receives a movement history of the wireless device 2 collected from the IoT apparatus 3, tracks the location of the wireless device 2, and obtains location information about whether the wireless device 2 is present or absent, thereby transmits them to the electronic apparatus 1.

A content providing apparatus 5 may transmit the image content and/or EPG UI provided by the content provider to the electronic apparatus 1 in response to a request. The content providing apparatus 5 may include a set-top box provided by each content provider, a broadcasting station of transmitting a broadcast signal, a cable broadcasting station of providing content through a cable, a media server of providing media through the Internet, etc.

Figure 2:
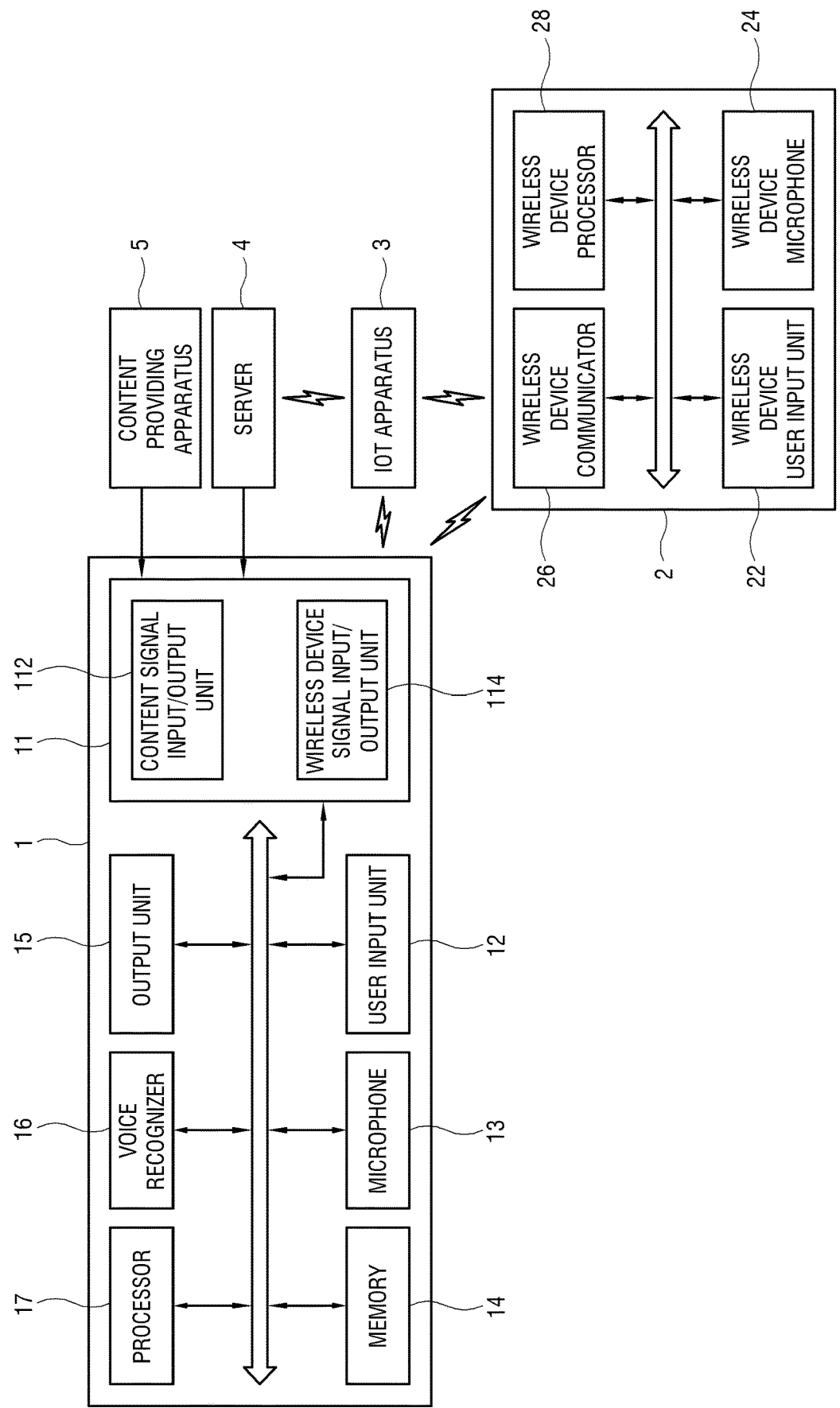
FIG. 2 is a block diagram showing a configuration of the electronic apparatus of FIG. 1.

FIG. 2 is a block diagram showing a configuration of the electronic apparatus of FIG. 1. The electronic apparatus 1 may include a signal input/output unit 11, a user input unit 12, a microphone 13, a memory 14, an output unit 15, a voice recognizer 16, and a processor 17. The electronic apparatus 1 may further include a camera, a geomagnetic sensor, a motion sensor, etc.

The signal input/output unit 11 as a signal input/output may include a content signal input/output unit 112, and a wireless device signal input/output unit 114.

The content signal input/output unit 112 receives a content signal from a sky-wave broadcasting station, a cable broadcasting station, a media broadcasting station, etc. The content signal input/output unit 112 may receive a content signal from a set-top box and the like dedicated content providing apparatus 5 or from a smartphone and the like personal mobile terminal. The content signal received in the content signal input/output unit 112 may be a wired signal or a wireless signal, and may be a digital signal or an analog signal. The content signal may be a sky-wave signal, a cable signal, a satellite signal or a network signal. The content signal input/output unit 112 may additionally include a universal serial bus (USB) port or the like to which a USB memory is connectable. The content signal input/output unit 112 may be embodied by the HDMI, the DP, the thunderbolt, or the like capable of receiving both video/audio signals. Of course, the content signal input/output unit 112 may include an input port and an output port to and from which video/audio signals are input and output. Further, the video and audio signals may be transmitted and received together or individually.

The content signal input/output unit 112 may receive an image signal of one channel among a plurality of channels under control of the processor 17. The image signal carries the image content and/or EPG UI provided by the content provider. The image content includes various broadcasting programs such as a soap opera, a movie, news, sports, music, video on demand (VOD), etc. without limitations.

The content signal input/output unit 112 may perform network communication with the content providing apparatus 5, the server 4, or other apparatuses.

The content signal input/output unit 112 may include a radio frequency (RF) circuit to transmit/receive an RF signal for wireless communication, and may be configured to perform one or more types of wireless communication among Wi-Fi, Bluetooth, Zigbee, iBeacon, ultra-wide band (UWB), wireless USB, and Near Field Communication (NFC).

The content signal input/output unit 112 may perform wired communication through a wired local area network (LAN). Besides connectors including a connector or terminal for the wired connection, various other communication methods may be applicable.

The wireless device signal input/output unit 114 transmits and receives for example an IR signal, a Bluetooth signal, a Wi-Fi signal, a Zigbee signal, an iBeacon signal, a UWB signal, a wireless USB signal, an NFC signal, etc. to and from the wireless device 2.

The electronic apparatus 1 may include dedicated communication modules for performing dedicated communication with the wireless device 2, the IoT apparatus 3, the content providing apparatus 5, and the server 4, respectively. For example, the electronic apparatus 1 may use a Bluetooth module or an IR module for the wireless device 2, a Zigbee module or an iBeacon module for the IoT apparatus 3, an HDMI module for the content providing apparatus 5, and an Ethernet modem or a Wi-Fi module for the server 4 to perform communication.

The electronic apparatus 1 may for example include the Wi-Fi module for common communication with all of the wireless device 2, the IoT apparatus 3, the content providing apparatus 5, and the server 4.

The electronic apparatus 1 may include a content signal input unit to which a content signal is input, and a content signal output unit from which a content signal is output to the outside. In this case, the content signal input and the content signal output unit may be integrated into one module, or may be provided as separate modules.

The user input unit 12 may receive a button input through various function key buttons, a touch or dragging input through a touch sensor, a voice input, a motion input through a motion sensor, etc. The user input unit 12 may receive the touch input, the button input, etc. of a user to find the wireless device 2.

The microphone 13 may receive a user's voice. A user's voice may be received through other routes than the microphone 13. For example, a user's voice may be received through the remote controller, the user's another terminal such as the smartphone, or the like which has a microphone, but there are no limits to this. A user's voice received in the remote controller, another terminal, etc. may include various voice commands, e.g. a command for finding the wireless device 2, as described above to control the electronic apparatus 1. The received user's voice may be recognized by the voice recognizer 16 as a control command for controlling the electronic apparatus 1.

The memory 14 refers to a computer-readable recording medium, and is configured to store unrestricted data. The memory 14 is accessed by the processor 17 to read, write, modify, update, etc. data. The data stored in the memory 14 may for example include movement history data of the wireless device 2, communication area information data, etc.

The memory 14 may include a wireless device location tracking module to track the location of the wireless device 2 within the communication area when an event executable by the processor 17 occurs to find the wireless device 2.

The memory 14 may include a big-data analysis module or an AI module to identify a location where the wireless device 2 is expected to be present or absent, based on the movement history of the wireless device 2, when the event executable by the processor 17 occurs to find the wireless device 2 and communication with the wireless device 2 is disabled.

The memory 14 may include a voice recognition module (or a voice recognition engine) for recognizing a received voice. Of course, the memory 14 may include an operating system, various applications executable on the operating system, image data, appended data, etc.

The memory 14 may include an IoT platform to perform sensing through a plurality of IoT apparatuses 3, networking with the IoT apparatus 3, and processing information related to the IoT apparatus 3.

The memory 14 includes a nonvolatile memory in which the control program to be executed by the processor 17 is installed, and a volatile memory to which at least a part of the installed control program is loaded.

The memory 14 may include a storage medium of at least one type among a flash memory type, a hard disk type, a multimedia card micro type, a card type (e.g. SD or XD memory, etc.), a random access memory (RAM), a static random access memory (SRAM), a read-only memory (ROM), an electrically erasable programmable read-only memory (EEPROM), a programmable read-only memory (PROM), a magnetic memory, a magnetic disc, or an optical disc.

The output unit 15 as an output may visually or acoustically output the information about the location where the wireless device 2 is currently present, as a result of tracking the wireless device 2 in response to an event for tracking the wireless device 2. The output unit 15 may visually or acoustically output information about at least one location where the wireless device 2 is expected to be present, based on ranking, in response to an event for tracking the wireless device 2. The output unit 15 may visually or acoustically output information about a route and time in which the wireless device 2 has last moved, and operation situations of peripheral devices.

The output unit 15 may include the display that displays an image based on a video signal subjected to signal processing, or he loudspeaker that outputs a sound based on an audio signal subjected to signal processing.

The display may display image content stored in the memory 14 or received from the content providing apparatus 5 or the server 4 through the signal input/output unit 11.

There are no limits to the type of the display. For example, the first display 130 may be embodied in various display panels of liquid crystal, plasma, light-emitting diodes, organic light-emitting diodes, a surface-conduction electron-emitter, a carbon nano-tube, nano-crystal, etc.

The loudspeaker may output audio content stored in the memory 14 or received from the content providing apparatus 5 or the server 4 through the signal input/output unit 11.

The loudspeaker may be embodied by a cone type loudspeaker, a dome type loudspeaker, a horn type loudspeaker, an omnidirectional cylindrical loudspeaker, a flat panel loudspeaker, a ribbon type loudspeaker, etc.

The voice recognizer 16 may execute the voice recognition module (or the voice recognition engine) stored in the memory 14, and recognize a user's voice received through the microphone 13, the wireless device 2, etc. The voice recognizer 16 recognizes whether a user's voice is a control command for controlling the electronic apparatus 1. The control command may for example include commands for turning on or off the electronic apparatus 1, channel switching, volume control, etc. Further, the control command may for example include a command for requesting display of a UI provided by the content providing apparatus 5 connected to the electronic apparatus 1.

An analog voice signal received in wireless device microphone may be converted into a digital signal and transmitted to the electronic apparatus 1 through, for example, Bluetooth or the like. Alternatively, an analog voice signal received in the microphone 13 internally provided in the electronic apparatus 1 may be converted into a digital signal and transmitted to the processor 17 of the electronic apparatus 1. Like this, the received voice signal is converted into a text through the voice recognizer 16 internally provided in the electronic apparatus 1.

The voice recognizer 16 may be integrally provided in the processor 17 or be excluded from the electronic apparatus 1. In this case, the received voice signal may be transmitted to the server (or the voice recognition server) 4.

The server (or the voice recognition server) 4 may be a speech-to-text (STT) server having only a function of converting data related to a voice signal into a proper text or a main server also serving as the STT server.

The STT server may return the processed data to the electronic apparatus 1, or may directly transmit the processed data to another server.

As described above, the processor 17 of the electronic apparatus 1 may perform a specific function based on a text received in the electronic apparatus 1 or a text autonomously converted by the voice recognizer 16 of the electronic apparatus 1. In this case, a converted text may also be transmitted to and processed in a separate server (or a server different from the STT server or a server serving as the STT server), and then information/data of the processed text may be returned to the electronic apparatus 1, so that the specific function can be implemented based on the information/data.

The processor 17 may control the parts of the electronic apparatus 1.

The processor 17 may execute a wireless device finding function and generate an event for finding the wireless device 2 when a user makes a request for checking the location of the wireless device 2 through the signal input/output unit 11, the user input unit 12, or the microphone 13.

The processor 17 may for example execute the wireless device location tracking module stored in the memory 14 when the event occurs to find the wireless device 2, track the wireless device 2, and output information about the location of the wireless device 2 through the output unit 15.

The processor 17 may execute the big-data analysis module or the AI module stored in the memory 14 when the event for finding the wireless device 2 occurs, and output information about a location, in which the wireless device 2 is expected to be present or absent based on the movement history of the wireless device 2 stored in the memory 14, through the output unit 15. Here, the location information may include information about a location where the wireless device 2 was last connected, information about a location where the wireless device 2 has most frequently stayed, information about a location where the wireless device 2 has never been present, information about an optimum location where the wireless device 2 is expected to be present based on an identified moving line, etc. The processor 17 may obtain various pieces of location information based on various algorithms and up-to-date analysis techniques according to situations.

The processor 17 may make a request for finding the location of the wireless device 2 to the server 4 instead of performing a process in itself when the event for finding the wireless device 2 occurs. The processor 17 may output information about the location of the wireless device 2, received from the server, through the output unit 15.

In particular, the processor 17 may use at least one of machine learning, neural network, deep learning algorithms as a rule-based or AI algorithm to perform at least a part among data analysis, data process and result information generation, in terms of performing at least one operation to predict a location where the wireless device 2 is highly likely to be present.

For example, the processor 17 may function as a learner and a recognizer. The learner may for example perform a function of generating the learned neural network, and the recognizer may perform a function of recognizing (or inferring, predicting, estimating and identifying) the data based on the learned neural network. The learner may generate or update the neural network. The learner may obtain learning data to generate the neural network. For example, the learner may obtain the learning data from the memory 14 or the outside. The learning data may be data used for teaching the neural network. For example, data such as a history that the wireless device 2 has moved, a history that the wireless device 2 has been used, the last location, time for which the wireless device 2 has moved, time for which the wireless device 2 stayed, how many times the wireless device stayed, operation histories of other peripheral IoT apparatuses 3, etc. may be used as the learning data to teach the neural network.

Before teaching the neural network based on the learning data, the learner may perform a preprocessing operation with regard to the obtained learning data or select data to be used in learning among a plurality of pieces of the learning data. For example, the learner may process the learning data to have a preset format, apply filtering to the learning data, or process the learning data to be suitable for the learning by adding/removing noise to/from the learning data. The learner may use the preprocessed learning data for generating the neural network set to perform the operation of predicting the location where the wireless device 2 is highly likely to be present or absent.

The learned neural network may include a plurality of neural networks (or layers). The nodes of the plurality of neural networks have weights, and the plurality of neural networks may be connected to one another so that an output value of a certain neural network can be used as an input value of another neural network. As an example of the neural network, there are a convolutional neural network (CNN), a deep neural network (DNN), a recurrent neural network (RNN), a restricted Boltzmann machine (RBM), a deep belief network (DBN), a bidirectional recurrent deep neural network (BRDNN) and deep Q-networks.

Meanwhile, the recognizer may obtain target data to perform the operation of predicting a location where the wireless device 2 is highly likely to be present or absent. The target data may be obtained from the memory 14 or the outside. The target data may be data targeted for recognition of the neural network. Before applying the target data to the learned neural network, the recognizer may preprocess the obtained target data or select data to be used in the recognition among a plurality of pieces of target data. For example, the recognizer may process the target data to have a preset format, apply filtering to the target data, or add/remove noise to/from the target data, thereby processing the target data into data suitable for recognition. The recognizer applies the preprocessed target data to the neural network, thereby obtaining an output value output from the neural network. According to various embodiments, the recognizer may obtain a probability value or a reliability value together with the output value.

The processor 17 may include at least one common processor, for example, a central processing unit (CPU), an application processor (AP) or a microprocessor, which loads at least a part of a control program from a nonvolatile memory installed with the control program to a volatile memory, and executes the loaded control program.

The processor 17 may include a single-core processor, a dual-core processor, a triple-core processor, a quad-core processor, and the like multiple-core processor. The processor 17 may include a plurality of processors. The processor 17 may for example include a main processor and a sub processor that operates in a sleep mode (e.g. when only standby power is supplied). Further, the processor, the ROM and the RAM are connected to one another via an internal bus.

The processor 17 may be achieved as included in a main SoC mounted to a built-in PCB of the electronic apparatus 1. Alternatively, the main SoC may further include the image processor.

The control program may include a program(s) achieved in the form of at least one among a basic input/output system (BIOS), a device driver, an operating system, a firmware, a platform, and an application. The application may be previously installed or stored when the electronic apparatus 1 is manufactured, or may be installed for use in the future on the basis of data received corresponding to the application from the outside. The data of the application may for example be downloaded from an external server such as an application market to the electronic apparatus 1. Such an external server is an example of a computer program product, but not limited thereto.

The wireless device 2 may be embodied by an IR remote controller that transmits 2-bit control information based on only an IR signal, or a multi-brand remote controller (MBR) that transmits user input information input by for example a button, a voice, a touch, dragging, etc. through an IR signal, a Bluetooth signal, a Wi-Fi signal, etc., or a smartphone or the like mobile terminal installed with a remote control application (app).

The wireless device 2 may include a wireless device user input unit 22, a wireless device microphone 24, a wireless device communicator 26, and a wireless device processor 28.

The wireless device user input unit 22 may receive a button input through various function-key buttons, a touch or dragging input through a touch sensor, a voice input through the wireless device microphone 24, a motion input through a motion sensor, etc.

The wireless device microphone 24 may receive a user's voice input. Thus, the received analog voice input is converted into a digital signal, and transmitted to a target to be controlled, for example, to the electronic apparatus 1 through the wireless device communicator 26, for example, a Bluetooth communication module, a Wi-Fi communication module, an infrared communication module, etc. When the wireless device 2 is embodied by a smartphone or the like mobile terminal having the voice recognition function, the received voice input may be transmitted to the electronic apparatus 1 in the form of a control signal recognized through the voice recognition. A user's voice input may include a command for turning on/off the electronic apparatus 1, a channel switching command, a volume control command, a command for requesting a home or guide image of the content provider.

The wireless device communicator 26 may transmit a control command received in the user input unit 22, a digital voice signal converted from an analog voice signal, and the like data to the signal input/output unit 11 of the electronic apparatus 1.

The wireless device communicator 26 may be configured to perform one or more among IR, RF, Wi-Fi, Bluetooth, Zigbee, UWB, Wireless USB, and NFC communications to perform the wireless communication.

The wireless device processor 28 may control the parts of the wireless device 2. The wireless device processor 28 may transmit a control command corresponding to a button input, a touch input, a dragging input, or a motion input to the electronic apparatus 1 through the wireless device communicator 26.

The wireless device processor 28 may convert an analog voice signal received in the wireless device microphone 24 into a digital voice signal, and transmits the digital voice signal to the electronic apparatus 1 through the wireless device communicator 26. When the wireless device 20 has a voice recognition function, the wireless device processor 28 may recognize an input voice signal and transmit a corresponding control command to the electronic apparatus 1 through the wireless device communicator 26.

Figure 3:
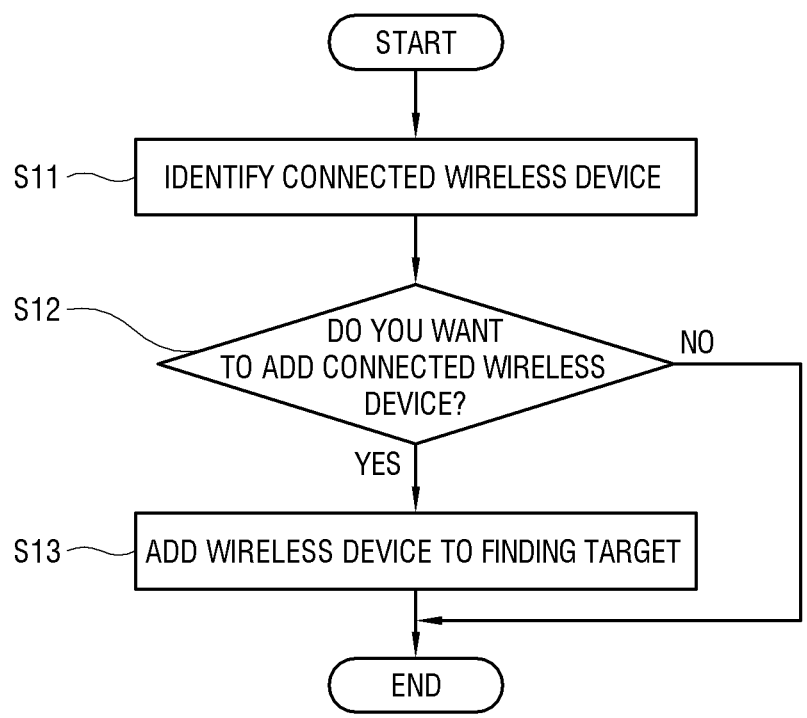
FIG. 3 is a flowchart of registering and setting a wireless device to an electronic apparatus according to an embodiment of the disclosure.

FIG. 3 is a flowchart of registering and setting a wireless device 2 to an electronic apparatus 1 according to an embodiment of the disclosure.

At operation S11, the processor 17 may identify whether the signal input/output unit 11, for example the wireless device 2 is wirelessly connected through at least one of IR, RF, Wi-Fi, Bluetooth, Zigbee, UWB, wireless USB, or NFC.

At operation S12, the processor 17 may output a list of identified connected wireless devices 2 through the output unit 15, and identify whether to add the connected wireless device 2 to a finding target. The processor 17 performs operation S13 when a user selects the connected wireless device 2 to be added to the finding target, but terminates when a user selects the connected wireless device 2 not to be added to the finding target.

At operation S13, the processor 17 may register and set the connected wireless device 2 added to the finding target, and then continuously track the location of the wireless device 2, thereby recording the movement history.

As described above, the wireless device 2, for example, the remote controllers of various electronic apparatuses, the smartphone, the smart pad, the smart watch, the tablet PC, the PDA, the electronic key, the healthcare device, and the like capable of performing the wireless communication through the wireless interface may be previously set as the targets for the finding function to the electronic apparatus 1.

To track or predict the location of the wireless device 2, the area range in which the wireless device 2 is movable, the identification location, etc. may be previously set within the communication area of the electronic apparatus 1.

Figure 4:
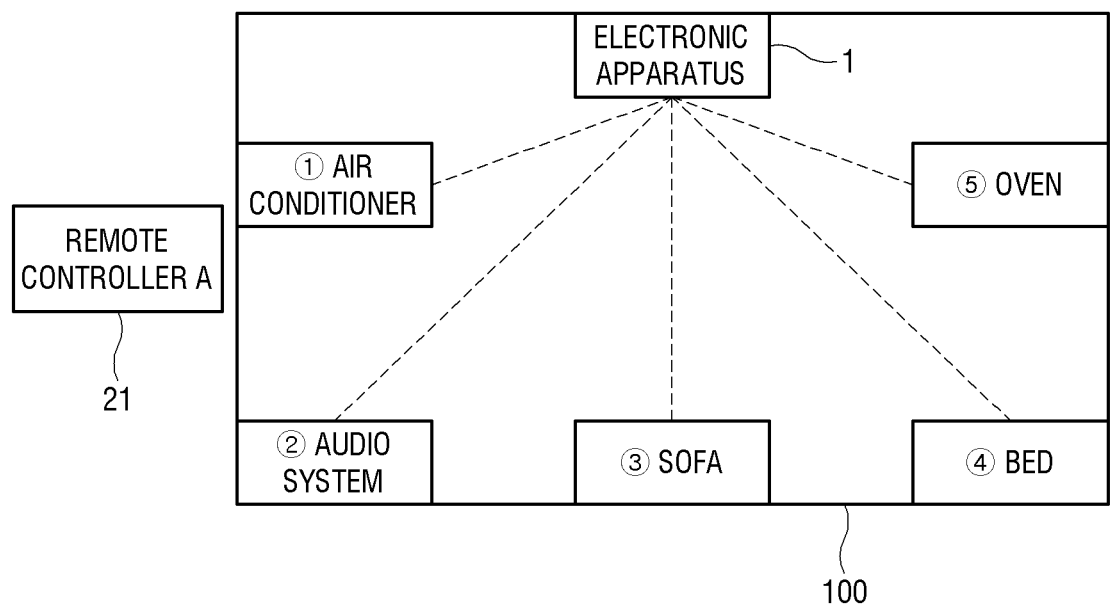
FIG. 4 illustrates a movable area range and identification locations of a wireless device set within a communication area of an electronic apparatus according to an embodiment of the disclosure.

FIG. 4 illustrates a movable area range and identification locations of a wireless device set within a communication area of an electronic apparatus according to an embodiment of the disclosure.

A remote controller A 21 of the electronic apparatus 1 may be previously registered as a finding target wireless device to the electronic apparatus 1 as shown in FIG. 3.

In this case, the movable area range and the identification location of the remote controller A 21 may be previously set using the remote controller A 21 as follows.

Referring to FIG. 4, a user locates the remote controller A 21 at the locations ①~⑤ and presses a button for an operation. Then, the electronic apparatus 1 may collect various pieces of information (e.g. speed, distance, angle, azimuth, etc.) based on an IR signal of the remote controller A 21. The processor 17 of the electronic apparatus 1 may set the area range from the current electronic apparatus 1, i.e. the size of a room 100, and the identification location, based on the information collected from many locations. The processor 17 may set the identification locations ①~⑤ for example, ① air conditioner, ② audio system, ③ sofa, ④ bed and ⑤ oven locations identifiable in sequence, based on a user's input.

In result, the processor 17 may output information about the location of the remote controller A 21, which tracked through the wireless communication or is expected to be present based on the movement history, to the output unit with reference to the previously set identification locations, when an event for finding the remote controller A 21 occurs based on a user's input.

Figure 5:
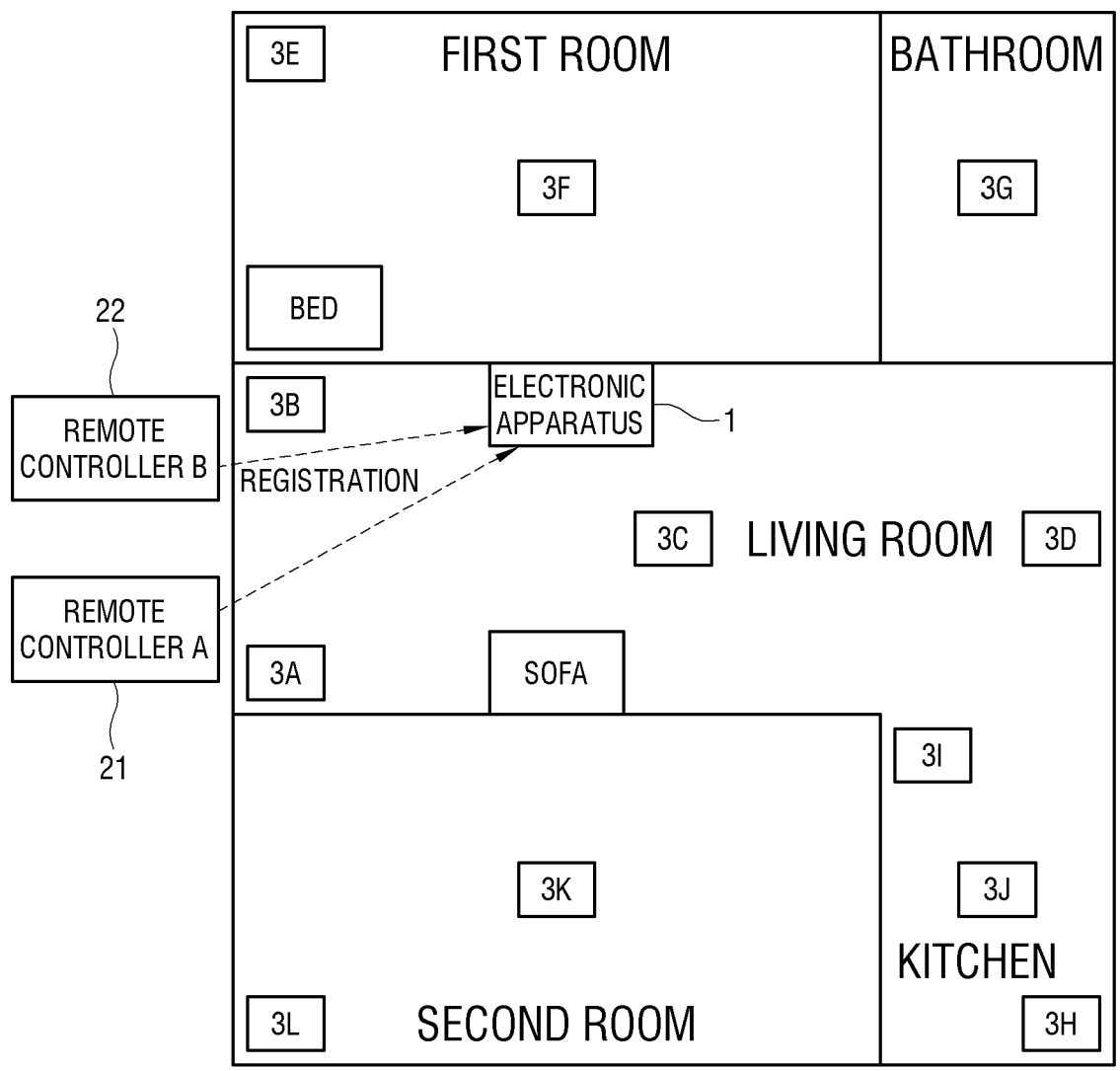
FIG. 5 illustrates movable area ranges and identification locations of wireless devices set within communication areas of an electronic apparatus according to another embodiment of the disclosure.

FIG. 5 illustrates movable area ranges and identification locations of wireless devices 2 set within communication areas of the electronic apparatus 1 according to another embodiment of the disclosure.

The remote controller A 21 of the electronic apparatus 1 and a remote controller B 22 of an air conditioner may be previously registered as the finding target wireless devices to the electronic apparatus 1 like the method shown in FIG. 3.

The electronic apparatus 1 may include an IoT platform that manages a plurality of IoT apparatuses 3A-3L located inside a house and connected through a network. Further, the plurality of IoT apparatuses 3A-3L may previously receive information about the remote controller A 21 of the electronic apparatus 1 and the remote controller B 22 of the air conditioner which are registered to the electronic apparatus 1, and thus perform wireless communication.

In this case, the movable area ranges and the identification locations of the remote controller A 21 and the remote controller B 22 may be previously set using the plurality of IoT apparatuses 3A-3L as follows.

Referring to FIG. 5, the communication area of the home may be partitioned to include a plurality of sub spaces such as a living room, a first room, a bathroom, a kitchen, and a second room. Here, the plurality of sub spaces may include not only a plurality of two-dimensional space regions but also three-dimensional space regions with upper or lower layers. The plurality of IoT apparatuses 3A-3L may for example be embodied by an air conditioner 3A, an audio system 3B, a lighting apparatus 3C and a lighting apparatus 3D which are placed in the living room; an air conditioner 3E and a lighting apparatus 3F which are placed in the first room; a lighting apparatus 3G which is placed in the bathroom; an oven 3H, a refrigerator 31 and a lighting apparatus 3J which are placed in the kitchen; and a lighting apparatus 3K and a computer 3L which are placed in the second room. The plurality of IoT apparatuses 3A-3L may be set as the movable area ranges and the identification locations for the remote controller A 21 and the remote controller B 22.

The electronic apparatus 1 may employ the plurality of IoT apparatuses 3A-3L to track the locations of the remote controller A 21 or the remote controller B 22 and collect the movement history. In this case, the location of the remote controller A 21 or the remote controller B 22 may be identified based on the locations of the plurality of IoT apparatuses 3A-3L. For example, when an event for finding the remote controller A 21 occurs by a user, the processor 17 of the electronic apparatus 1 performs communication with the remote controller A 21 and tracks the current location of the remote controller A 21, i.e. the location of one among the plurality of IoT apparatuses 3A-3L. When it is impossible to track the location of the remote controller A 21 as its battery is completely used up or its communication is disabled, the processor 17 of the electronic apparatus 1 may output information about a location where the remote controller A 21 last stayed, a location where the remote controller A 21 most frequently stayed for a predetermined period of time, a location where remote controller A 21 has never been present, etc. based on the locations of the IoT apparatuses 3A-3L.

The movable area range and the identification locations of the wireless device 2 may be set by combination of the manual setting of the remote controller as shown in FIG. 4 and the setting based on the plurality of IoT apparatuses as shown in FIG. 5. For example, the manual setting of the remote controller may be applied to an opened one-room or the like space, and the setting based on the plurality of IoT apparatuses may be applied to multi-rooms or the like spaces.

Figure 6:
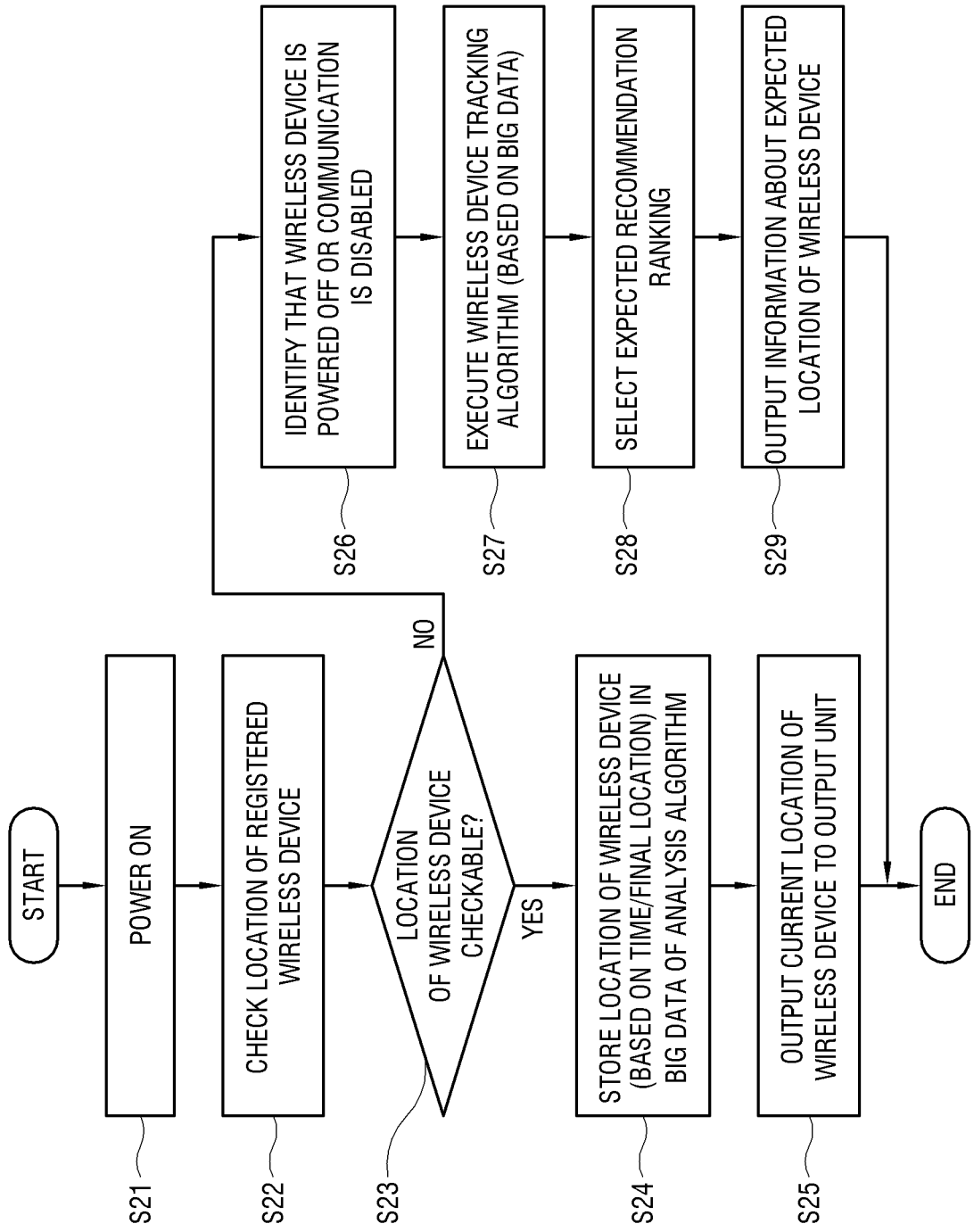
FIG. 6 is a flowchart showing a method of controlling an electronic apparatus according to an embodiment of the disclosure.
Figure 7:
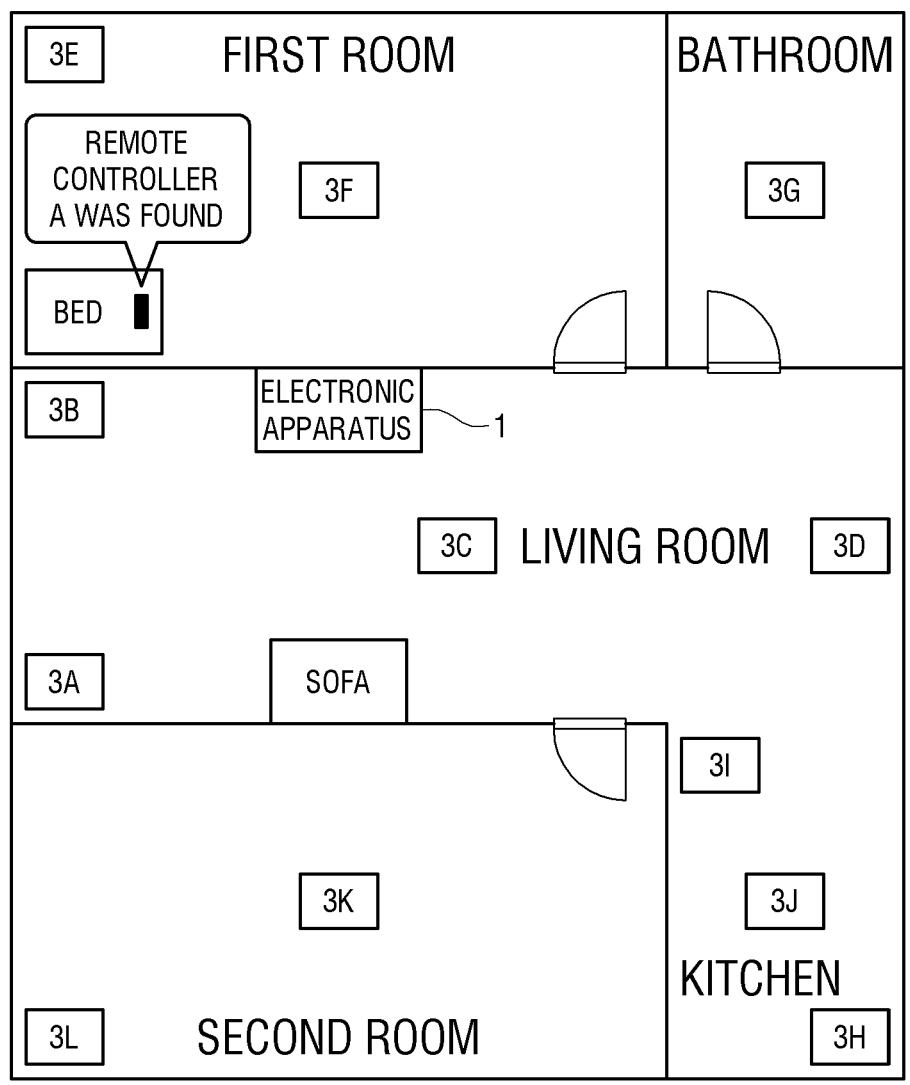
FIG. 7 illustrates a screen of displaying a location where a wireless device is found.
Figure 8:
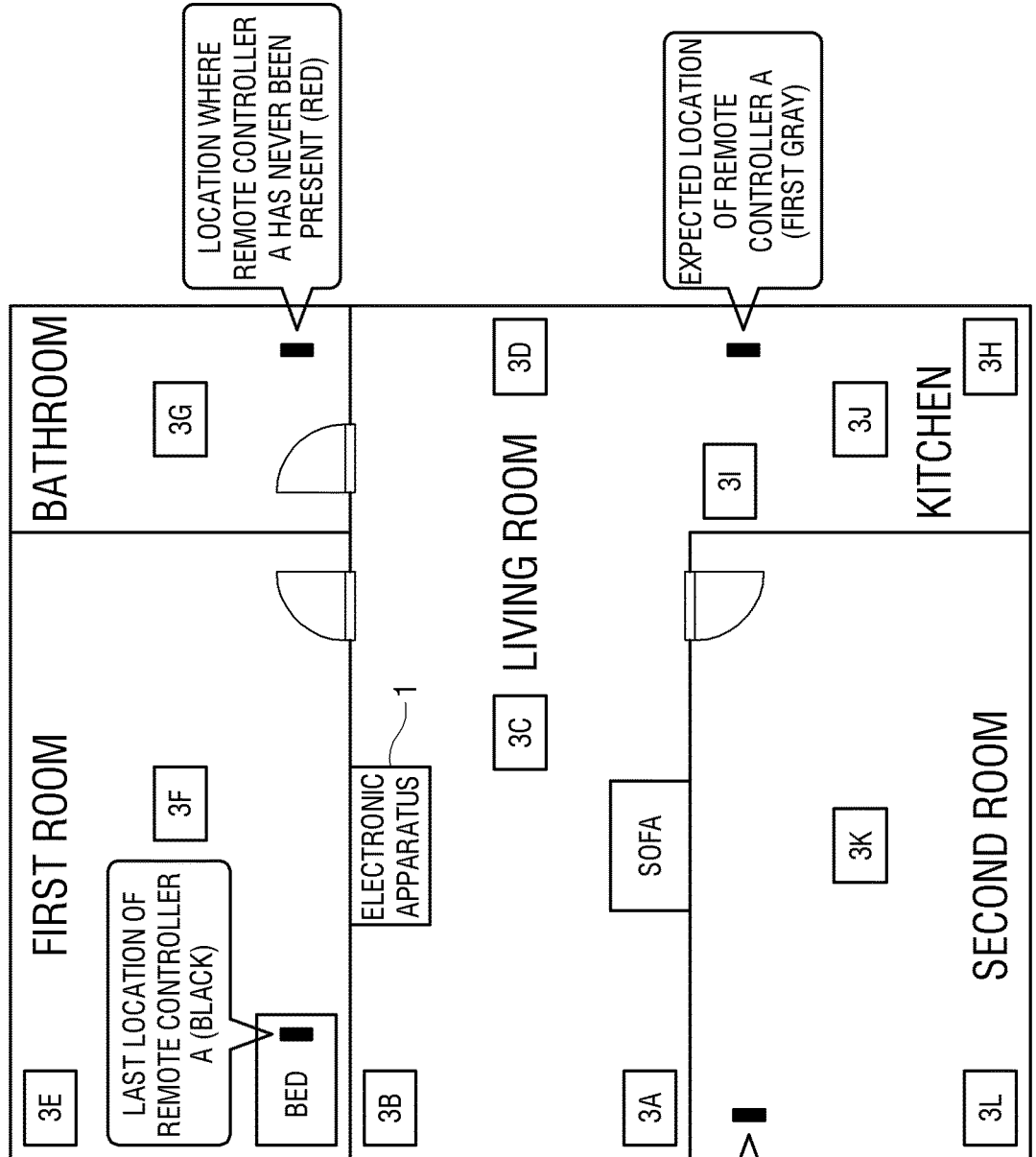
FIG. 8 illustrates a screen of displaying locations where a wireless device is expected to be located.

FIG. 6 is a flowchart showing a method of controlling the electronic apparatus 1 according to an embodiment of the disclosure, FIG. 7 illustrates a screen of displaying a location where the wireless device 2 is found, and FIG. 8 illustrates a screen of displaying locations where the wireless device 2 is expected to be located.

First, the finding target, i.e. the wireless device 2 may be previously registered to the electronic apparatus 1. Further, the movable area range and the identification locations for the wireless device 2 may be previously set as shown in FIGS. 4 and 5.

Further, the processor 17 may periodically and repetitively track and record the previously registered location of the wireless device 2. The location information about the wireless device 2 may be continuously accumulated, and then older data of the location information is first deleted to thereby manage storage capacity.

At operation S21, the electronic apparatus 1 is turned on by a user's command.

At operation S22, the electronic apparatus 1 receives a user's request command for finding a specific registered wireless device 2 through a button input, a touch input or a voice corresponding to the function for finding the wireless device 2. As such a specific event for finding the wireless device 2 occurs, the processor 17 checks the current location of the registered wireless device 2 through the wireless interface.

At operation S23, the processor 17 identifies whether the location of the specific wireless device 2 is checkable. The processor 17 enters operation S24 when the location of the wireless device 2 is checkable, but enters operation S26 when it is not checkable.

At operation S24, the processor 17 may execute a location tracking module to identify the current location of the specific wireless device 2. The current location may be identified by tracking the wireless device 2 in real time, or based on information about the location where the wireless device 2 was last located among pieces of information about the locations of the wireless device 2 recorded in the memory 14.

At operation S25, the processor 17 outputs information about the current location of the specific wireless device 2 through the output unit 15. In this case, when the output unit 15 is the display, the processor 17 may display the set area range and identification location and an icon of the wireless device 2 on a screen as shown in FIG. 7. Referring to FIG. 7, it may be displayed that the wireless device 2 is located in the first room. Like this, when it is possible for the electronic apparatus 1 or the IoT apparatus to normally communicate with the wireless device 2, the processor 17 can accurately track the location of the wireless device 2.

At operation S26, the processor 17 may identify whether the battery of the wireless device 2 is completely used up or the communication with the wireless device 2 is disabled. When it is identified that the battery is completely used up or the communication is disabled, it is impossible for the processor 17 to track the current location of the wireless device 2 in real time.

At operation S27, the processor 17 may execute the big-data analysis module or the AI module, or use the server 4 or the like external apparatus to analyze the movement history of the wireless device 2 stored in the memory 14.

At operation S28, the processor 17 may analyze the movement history of the wireless device 2 and select a location, in which the wireless device 2 is expected to be present, as a high-ranking location. The processor 17 may make the movement history of the wireless device 2 be weighted and thus assigned with expected ranking. For example, the processor 17 may give the highest ranking to the location where the wireless device 2 last stayed, give the next higher ranking to the location where the wireless device 2 most frequently stayed, and give the lowest ranking to the location where the wireless device 2 has never stayed.

At operation S29, the processor 17 may display the locations where the wireless device 2 is expected to be present, for example, a last location, a first location where the wireless device 2 is more likely to be present, a second location where the wireless device 2 is less likely to be present, and a location where the wireless device 2 is expected to be absent. Of course, one or more expected locations may be displayed. The processor 17 may display an icon representing the wireless device 2 on the expected locations according to colors. For example, the icon may be displayed with black at the last location, first gray of which color density is lower than black at the first location, second gray of which color density is lower than the first gray at a second location, and red at the location where absence is expected.

Alternatively, when a user inputs a voice corresponding to a request for finding the wireless device 2 to the electronic apparatus 1, the electronic apparatus 1 or the server 4 recognizes the voice and finds the wireless device 2, thereby outputting information about a location, in which where the wireless device 2 is present or expected to be present, through the loudspeaker.

Alternatively, the operation of analyzing the movement history of the wireless device 2 may be performed in the server 4 connected through the network. In this case, when the electronic apparatus 1 receives a request for finding the wireless device 2 from a user, the electronic apparatus 1 may transmit the request to the server 4.

Alternatively, a user may not remember a location where the wireless device 2 is located. Therefore, the processor 17 may output information about a route and time in which the wireless device 2 last moved, a control history of the wireless device 2, operation histories of the IoT apparatuses associated with the movement of the wireless device 2, etc. in order to evoke the memory of the user.

Figure 9:
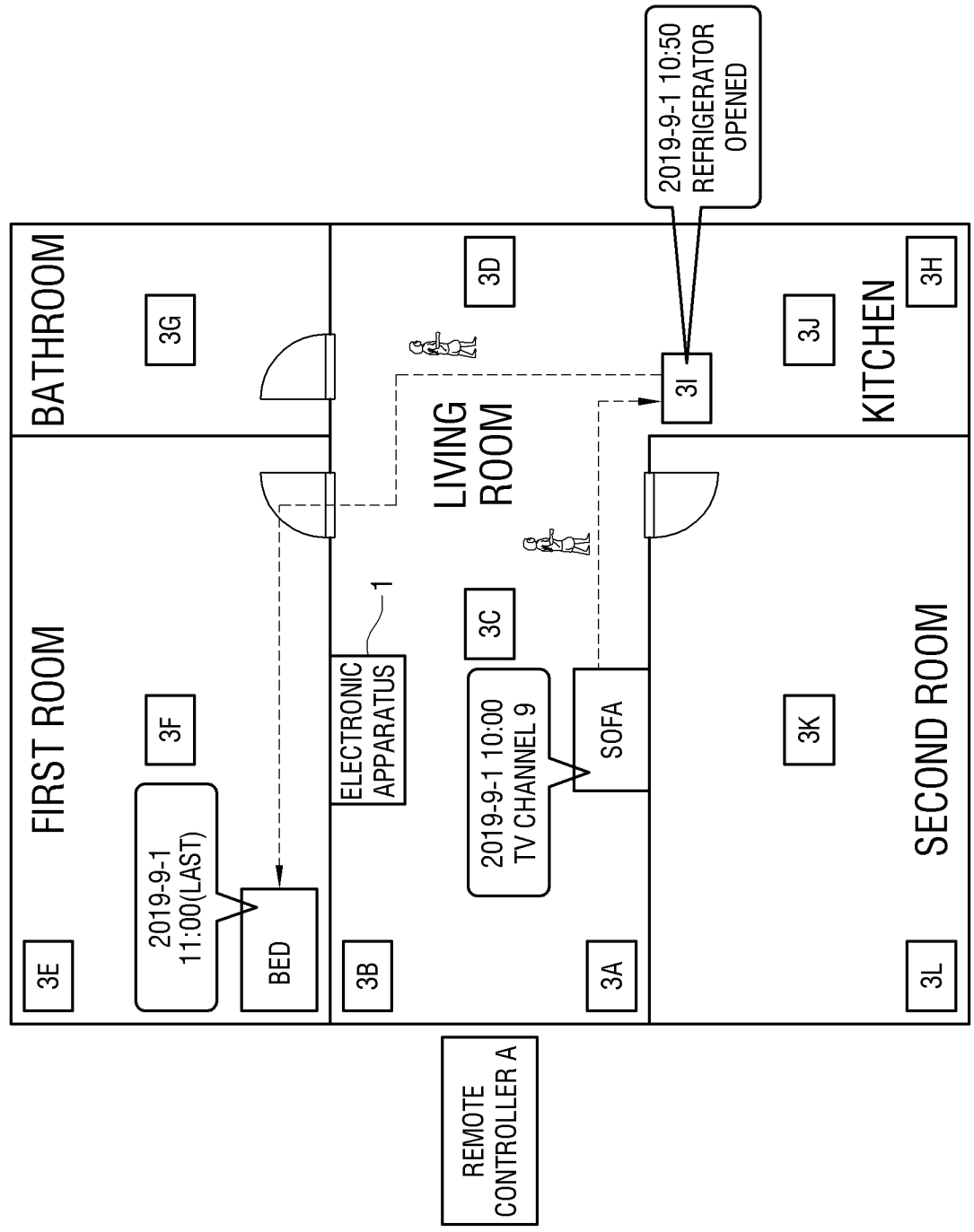
FIG. 9 illustrates a screen of displaying information about a route and time in which a wireless device last moved, and information about use of IoT apparatuses.

FIG. 9 illustrates a screen of displaying information about a route and time in which a wireless device last moved, and information about use of IoT apparatuses.

Referring to FIG. 9, the processor 17 may display a route along which the wireless device 2 last moved from the living room to the first room via the kitchen. The processor 17 may display that the wireless device 2 was used in the living room to select and watch a channel No. 9 of the TV at 10:00 on Sep. 1, 2019, moved to the kitchen with the refrigerator opened at 10:50, and last moved to the bed in the first room at 11:00.

Like this, the electronic apparatus 1 according to an embodiment of the disclosure shows a user the information about the moved route and time of the wireless device 2 desired to be found and the information about the use of the IoT apparatuses, thereby bring the user a memory of the wireless device 2 needed to be found.

Alternatively, when the location where the wireless device 2 last moved is a front door, the processor 17 may identify that the wireless device 2 moved outside a house.

According to an embodiment of the disclosure, the wireless device location tracking module for tracking the location of the wireless device 2, and the big-data analysis module or AI module for identifying the location where the wireless device 2 is expected to be present or absent based on the movement history of the wireless device 2 may be embodied by a computer program product stored in the memory 14 as the computer-readable recording medium or a computer program product transmitted and received through network communication. Further, the foregoing modules may be independently or integrally embodied by a computer program.

A computer program according to an embodiment of the disclosure may identify the location where the wireless device is expected to be present within the communication area based on the movement history of the wireless device obtained in response to occurrence of the event for finding the wireless device, and execute operation an operation to output information about the identified locations.

As described above, the electronic apparatus according to the disclosure registers various wireless devices, and then provides an expected location of the wireless device based on an optimally recommended algorithm (AI/Big data) so that the wireless device can be easily found even through its battery is completely used up or its wireless communication is disabled.

Although a few embodiments of the disclosure have been illustrated and described, the disclosure is not limited to these embodiments, and various modifications can be made by a person having an ordinary knowledge in the art without departing from the scope of the disclosure and should be construed within the technical concept or prospect of the disclosure.

What is claimed is:

1. An electronic apparatus comprising: a memory storing at least one computer program; and
 a processor that executes the at least one computer program to:
  collect movement history of a wireless device that wireless communicates with the electronic apparatus within a communication area partitioned into a plurality of previously defined sub areas, and the plurality of previously defined sub areas comprises three-dimensional space areas, and,
  when an event for finding the wireless device occurs, output information about a location where the wireless device is expected to be present within the communication area based on the movement history of the wireless device,
  wherein the information about the location comprises information about at least one of a route and a time in which the wireless device moves.

2. The electronic apparatus according to claim 1, wherein the processor executes the at least one computer program to output the information about the location to indicate a location where the wireless device last moved of a plurality of locations where the movement history indicates that the wireless device has been located.

3. The electronic apparatus according to claim 1, wherein the processor executes the at least one computer program to further output information about a location where the wireless device is expected to be absent based on a location to which the wireless device has not moved within the communication area based on the movement history.

4. The electronic apparatus according to claim 1, wherein the processor executes the at least one computer program to output information about
 a plurality of locations where the wireless device is expected to be present within the communication area in order of likelihood that the wireless device is present in the plurality of locations, respectively.

5. The electronic apparatus according to claim 4, wherein the processor executes the at least one computer program to rank the plurality of locations based on frequency that the wireless device stayed in the plurality of locations, respectively.

6. The electronic apparatus according to claim 1, wherein the processor executes the at least one computer program to receive information about the movement history of the wireless device from an external device provided within the communication area.

7. The electronic apparatus according to claim 1, wherein the memory is configured to comprise a location tracking module for the wireless device.

8. The electronic apparatus according to claim 1, further comprising:
 a display,
 wherein the processor executes the at least one computer program to display a user interface showing the information about the location on the display.

9. The electronic apparatus according to claim 1, further comprising:
 a loudspeaker,
 wherein the processor executes the at least one computer program to output the information about the location to the loudspeaker.

10. The electronic apparatus according to claim 1, wherein the processor executes the at least one computer program to collect the movement history of the wireless device as the wireless device is identified as a previously defined device.

11. A method of controlling an electronic apparatus, comprising:
 registering a wireless device;
 collecting movement history of the registered wireless device within a communication area partitioned into a plurality of previously defined sub areas, and the plurality of previously defined sub areas comprises three-dimensional space areas; and,
 when an event for finding the registered wireless device occurs, outputting information about a location in which the registered wireless device is expected to be present within the communication area based on the movement history of the wireless device,
 wherein the information about the location comprises information about at least one of a route and a time in which the wireless device moved.

12. The electronic apparatus according to claim 1, wherein the event for finding the wireless device occurs when the wireless device is powered off or wireless communication capability of the wireless device is disabled.

13. The method according to claim 11, wherein the event for finding the registered wireless device occurs when the wireless device is powered off or wireless communication capability of the wireless device is disabled.

\* \* \* \* \*